US009140595B2

(12) United States Patent
Cox et al.

(10) Patent No.: US 9,140,595 B2
(45) Date of Patent: Sep. 22, 2015

(54) FLUID LEVEL INDICATOR FOR A LINED BULK MATERIAL CONTAINER

(71) Applicants: C. Anthony Cox, Colleyville, TX (US); James A. Austin, Fort Worth, TX (US)

(72) Inventors: C. Anthony Cox, Colleyville, TX (US); James A. Austin, Fort Worth, TX (US)

(73) Assignee: ConeCraft, Inc., Fort Worth, TX (US)

( * ) Notice: Subject to any disclaimer, the term of this patent is extended or adjusted under 35 U.S.C. 154(b) by 282 days.

(21) Appl. No.: 13/972,363

(22) Filed: Aug. 21, 2013

(65) Prior Publication Data

US 2015/0053130 A1 Feb. 26, 2015

(51) Int. Cl.
*G01F 23/00* (2006.01)
*G01F 23/16* (2006.01)

(52) U.S. Cl.
CPC ...................... *G01F 23/00* (2013.01)

(58) Field of Classification Search
CPC ..... G01F 23/00; G01F 23/0007; G01F 23/16; G01F 23/161; G01F 23/164; B65D 25/26
USPC .......... 116/70, 71, 227, 281, 283; 141/290 R; 222/23, 49, 50; 73/290 R
See application file for complete search history.

(56) References Cited

U.S. PATENT DOCUMENTS

| | | | |
|---|---|---|---|
| 910,606 A | 1/1909 | Swanson | |
| 4,421,124 A * | 12/1983 | Marshall | 600/491 |
| 4,799,383 A | 1/1989 | Johnson et al. | |
| 5,088,323 A | 2/1992 | Johnson et al. | |
| 5,325,716 A | 7/1994 | Hafner et al. | |
| 5,677,492 A * | 10/1997 | Huang | 73/715 |
| 6,067,927 A | 5/2000 | Johnson et al. | |
| 6,763,780 B2 * | 7/2004 | Place | 116/228 |
| 6,817,311 B1 * | 11/2004 | Treen et al. | 116/270 |
| 8,181,515 B2 | 5/2012 | Stephens | |
| 2014/0109823 A1 * | 4/2014 | Leavitt | 116/268 |
| 2014/0158573 A1 * | 6/2014 | Van Haaren | 206/459.1 |

FOREIGN PATENT DOCUMENTS

| | | | | |
|---|---|---|---|---|
| CN | 201885777 U * | 6/2011 | | G01F 23/16 |
| EP | 2722575 A1 * | 4/2014 | | F16L 55/053 |
| WO | WO 2007069887 A1 * | 6/2007 | | F15B 1/02 |

* cited by examiner

*Primary Examiner* — Richard A. Smith
(74) *Attorney, Agent, or Firm* — Dan Brown Law Office; Daniel R. Brown

(57) ABSTRACT

A level indicator for a container that is lined with a membrane for holding fluid, and which has a wall with an aperture formed through it. A frame is attached to the container wall adjacent to the aperture. A plunger is engaged with the frame, and moves between an extended position, where the plunger extends through the aperture and into the interior of the container, and a retracted position, where the plunger does not substantially extend into the interior of the container. An elastic member between the frame and the plunger urges the plunger to the extended position. A visual indicator is driven by the plunger between an indicating position and a non-indicating position. The force of the elastic member is selected to enable the membrane, under static pressure of fluid within the container, to urge the plunger to the retracted position.

20 Claims, 5 Drawing Sheets

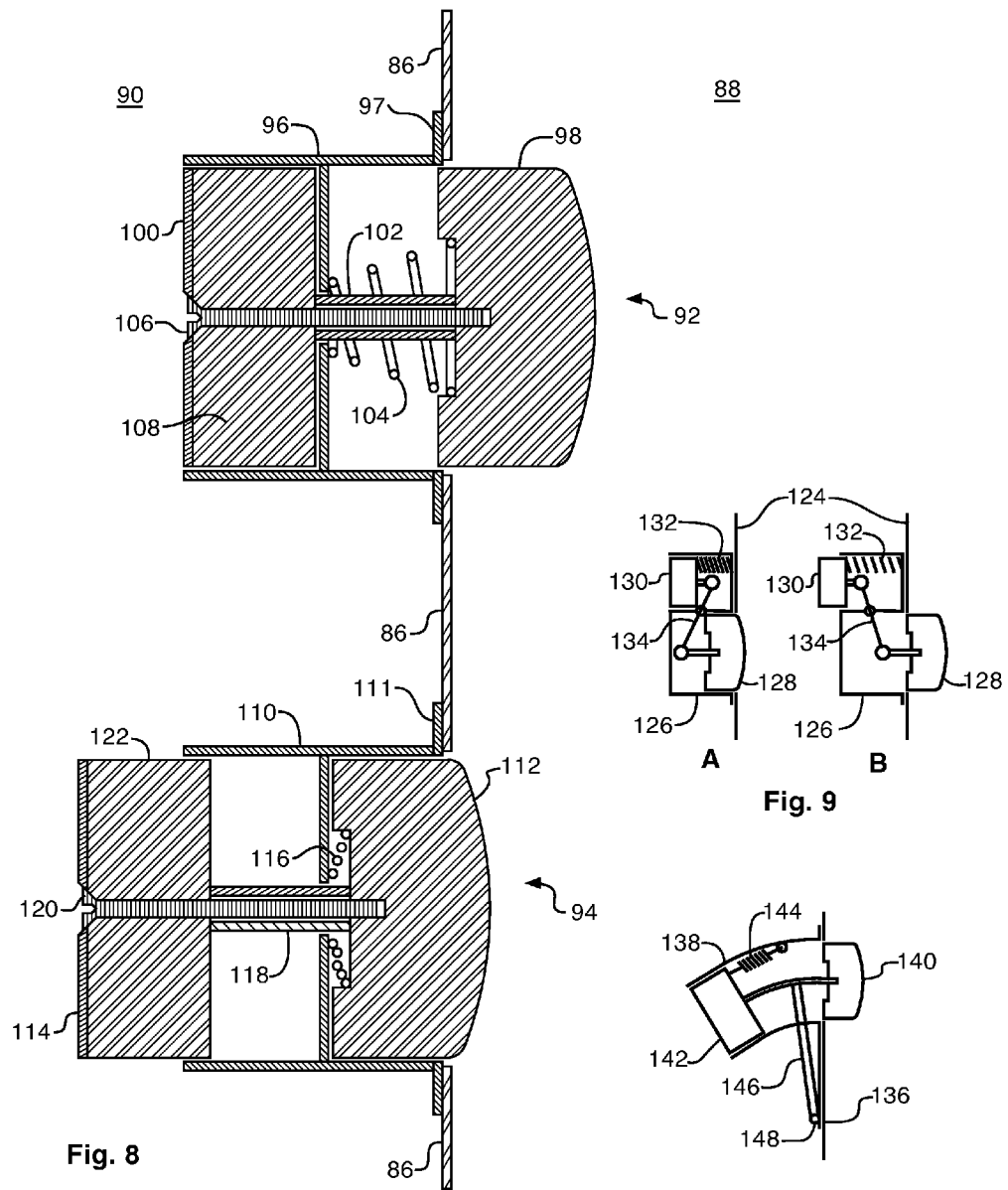

FLUID LEVEL INDICATOR FOR A LINED BULK MATERIAL CONTAINER

BACKGROUND OF THE INVENTION

1. Field of the Invention

The present invention relates fluid level indicators. More particularly, the present invention relates to fluid level indicators useful in conjunction with rigid containers having flexible liners for storing or processing liquids or other fluid materials.

2. Description of the Related Art

Storage and processing containers are in widespread use in various industries and other endeavors. Many of these are used to contain liquids and other flowable bulk materials, such as powders and granular materials. While containing many types of fluid materials, it is preferable to line the container with a polymeric membrane so that the bulk material is either impermeably contained in a suitable polymeric material, or to insure that the bulk materials does not contact the container itself. For example, in the case of pharmaceutical and food grade materials, a polymeric liner, such as PVC or polypropylene, may be used to maintain the purity and cleanliness of the bulk material. In other instances, the bulk material may react with a storage container itself, so a polymeric liner is used to prevent such reactions.

Various fluid level indicators are known and used with liquids and other bulk fluid materials. Most level indicators sense fluid level using some form of direct contact with the contained bulk material. For example, the classic floating level indicator is commonly used in fuel tanks Another classic example is the liquid sight gauge, where the contained liquid level is visually presented through a transparent portion of the gauge. Other fluid level indicators use more sophisticated detection techniques, including acoustic detection, proximity detection, mass, pressure and so forth. However, these more sophisticated techniques are generally complex, expensive, and somewhat unreliable over time unless maintained by skilled technicians.

In the case where an impermeable liner is placed between a rigid container and a bulk fluid material being stored or processed therein, the challenges associated with the task of fluid level indication are increased. The operation of devices such as float gauges, sight glasses, and other direct contact system are interfered with by the liner membrane. Plumbing connections are more challenging, and would reduce system reliability and performance if attempted. Electronic fluid level detection devices can be interfered with as well. Thus it can be appreciated that there is a need in the art for an apparatus for indicating the fluid level in a lined container that overcomes the challenges associated with prior art designs.

SUMMARY OF THE INVENTION

The need in the art is addressed by the teaching of the present disclosure. The present disclosure teaches a level indicator apparatus for use with a container with an interior that is lined with a membrane for holding fluid, and which has a wall with an aperture formed into to. The apparatus includes a frame for attachment to the container wall adjacent to the aperture. A plunger is engaged with the frame, and is movable between an extended position, where the plunger extends through the aperture and into the interior of the container, and a retracted position, where the plunger does not substantially extend into the interior of the container. An elastic member is disposed between the frame and the plunger, and is oriented to deliver a force to urge the plunger to the extended position. A visual indicator is driven by the plunger between an indicating position and a non-indicating position. The force of the elastic member is selected to enable the membrane, under static pressure of fluid within the container, to urge the plunger to the retracted position.

In a specific embodiment of the foregoing apparatus, the container is a food grade or pharmaceutical grade process bin, and the membrane is a impermeable liner for the storage bin. In another embodiment, the membrane is a replaceable polymeric liner.

In a specific embodiment of the foregoing apparatus, the container wall may be an insulated wall or a clad wall, and the frame and the plunger are proportioned to accommodate additional thickness of the container wall.

In a specific embodiment of the foregoing apparatus, the frame is fabricated from a tubular stock material, and the plunger is movable within, and guided by, the tubular stock material. In a refinement to this embodiment, the tubular stock material is round stainless steel. In another specific embodiment the frame includes a flange that can be fastened to the wall around the aperture.

In a specific embodiment of the foregoing apparatus, the plunger is fabricated from a polymeric material. In another embodiment, the plunger has a distal face portion that engages the membrane, and that distal face portion is smooth and rounded to reduce possible damage to the membrane.

In a specific embodiment of the foregoing apparatus, the elastic member is a spring. In a refinement to this embodiment, the spring can selected from a compression spring, a tension spring, or other spring types know to those skilled in the art. In another specific embodiment, the spring couples the force to the plunger through a linkage. In a refinement to this embodiment the linkage is a lever.

In a specific embodiment of the foregoing apparatus, the visual indicator has a visual cue portion, and the visual cue portion is visible in the indicating position, but the visual cue portion is concealed in the non-indicating position. In a refinement to this embodiment, the frame conceals the visual cue portion in the non-indicating position. In another refinement, the visual cue portion is finished in a color that contrasts with the color of the frame.

In a specific embodiment of the foregoing apparatus, the plunger and the visual indicator are rigidly connected, and move in unison. In another embodiment, the plunger and the visual indicator are connected by a linkage. In anther embodiment, the plunger and the visual indicator are connected through a pivot.

The present disclosure also teaches a level indicator apparatus for use with a process bin, suitable for pharmaceutical product production, that has an impermeable polymeric liner for holding fluid inside, and which has a wall with an aperture formed through it. The apparatus includes a tubular frame with a flange to attach it to the process bin wall around the aperture. There is a plunger engaged within the tubular frame, which slides inside between an extended position, where the plunger extends through the aperture and into the interior of the storage bin, and a retracted position, where the plunger doesn't extend into the interior of the storage bin. The plunger has a distal face portion that engages the impermeable polymeric liner, and the distal face portion is smooth and rounded to reduce possible damage to the impermeable polymeric liner. A spring is disposed between the frame and the plunger, and oriented to deliver a force that urges the plunger to the extended position. A visual indicator is rigidly connected to the plunger so as to move in unison therewith, between an indicating position and a non-indicating position. The visual indicator having a visual cue portion, and the visual cue portion is visible in the indicating position, but the visual cue portion is concealed by the tubular frame in the non-indicating position. Also, the visual cue portion is finished in a color that contracts with the frame. In operations, the force of the spring is selected to enable the impermeable polymeric liner, under static pressure of fluid within the storage bin, to urge the plunger to the retracted position, thereby exposing the visual cue portion of the visual indicator.

BRIEF DESCRIPTION OF THE DRAWINGS

FIG. 8 is a section view drawing of a pair of level indicators according to an illustrative embodiment of the present invention.

FIGS. 9A and 9B are schematic diagrams of a level indicator apparatus in the retracted and extended positions, respectively, according to an illustrative embodiment of the present invention.

FIG. 10 is a schematic diagram of a level indicator apparatus according to an illustrative embodiment of the present invention.

DESCRIPTION OF THE INVENTION

Figure 1:
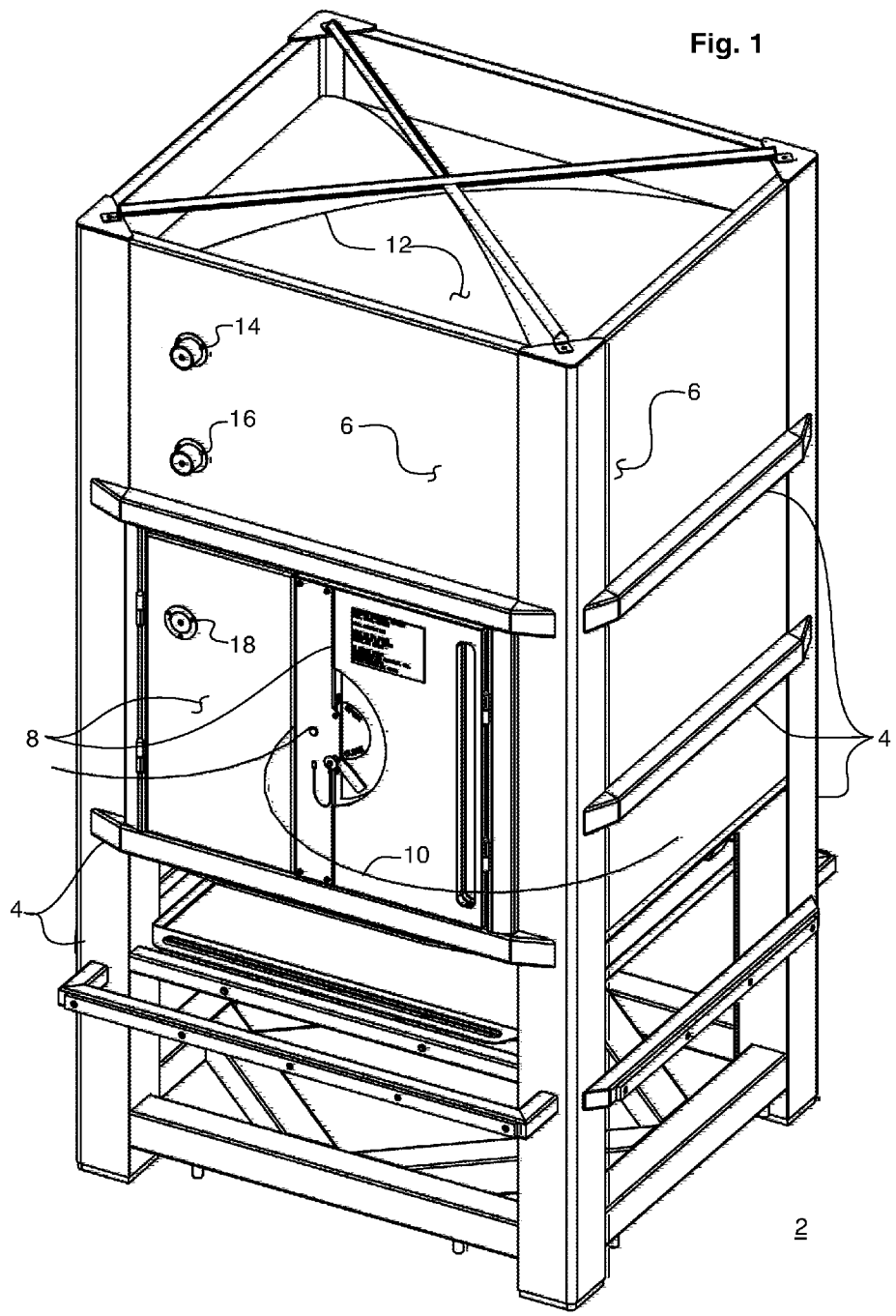
FIG. 1 is a perspective view drawing of a liquid container with plural level indicators according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods or components to form various apparatus and systems. Accordingly, the apparatus and system components and method steps have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

An illustrative embodiment of the present invention is applied to the pharmaceutical industry, and in particular, processing bins that employ polymeric liners to impermeably retain a fluid content, which is commonly a liquid. Such processing and storage bins a commonly fabricated from stainless steel, for the benefits of corrosion resistance, cleanliness, and durability. As such, these bins are opaque and the contents are concealed from view. Although, it is known to provide a sight glass so that the interior can be partially viewed. However, the use of a sight class adds cost and reduced the durability of such bins. The polymeric liners are generally translucent to opaque, so that they reduce the effectiveness of a sight glass. Generally, the user would need to approach the sight glass and study it with care to ascertain and approximate liquid level. Also note that the polymeric liners are generally flexible bag-like structures that can be replaced from time to time.

Reference is directed to FIG. 1, which is a perspective view drawing of a liquid container 2 with plural level indicators 14, 16, 18 according to an illustrative embodiment of the present invention. This container 2 is an example of a fluid storage bin suitable for use in pharmaceutical processing and storage. The container 2 is fabricated with an exterior frame 4, which comprises plural stainless steel structure shapes, such as rectangular tubing and angle iron shapes. The walls 6 are commonly fabricated from stainless steel sheet or plate stock. As such, the interior of the container 2 is smooth and suitable from housing a polymeric bag-type liner without risk for damage or puncture. This exemplary processing bin 2 comprises a pair of access doors 8, which swing open 10 for access to the interior of the bin 2. The top of a polymeric bag 12 is visible at the open top of the container 2. As the polymeric liner 12 is filled and emptied, the unfilled portion of the polymeric bag moves upwardly and downwardly with the level of the liquid contained therein. Of course, the static pressure of the liquid displaces the polymeric liner 12 firmly against the walls 6 of the bin 2. This figure illustrates the use of level indicators of the present invention, including two level indicators 14, 16 mounted in the wall 6 of the bin 2, and one level indicator 18 installed in the door 8 of the bin 2. The design and function of the level indicators will be more fully described hereinafter.

Figure 2:
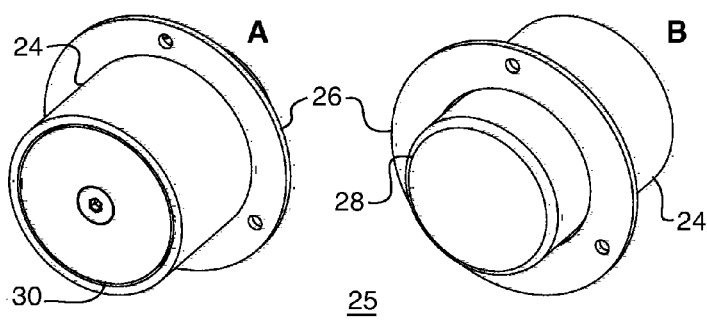
FIGS. 2A and 2B are exterior and interior views, respectively, of a level indicating apparatus according to an illustrative embodiment of the present invention.

Reference is directed to FIGS. 2A and 2B, which are exterior and interior side views, respectively, of a level indicating apparatus 25 according to an illustrative embodiment of the present invention. FIG. 2 illustrates a level indicating apparatus 25 that is suitable for use on thin walled containers, where the wall thickness is not a significant factor in the distance from the level indicator mounting flange 26 to interior surface of the bin (not shown). The level indicator 25 consists of a frame 24, which has a mounting flange 26. The mounting flange attaches about an aperture formed in the host container wall (not shown), and the frame 24 extends outwardly on the exterior of the container. A plunger 28 and a visual indicator 30 are slideably supported in the frame 24. In FIGS. 2A and 2B, the level indicator 25 is shown in the extended position, where the plunger portion 28 is extended into the interior of the container (not shown). The exterior surface of the visual indicator 30 is flush with the end of the frame 24. Note that FIG. 2A shows the exterior side view, and FIG. 2B shows the interior side view of the visual indicator 25.

Figure 3:
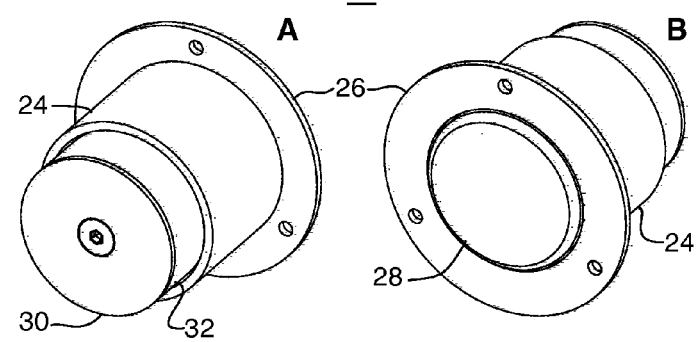
FIGS. 3A and 3B are exterior and interior views, respectively, of a level indicating apparatus according to an illustrative embodiment of the present invention.

Reference is directed to FIGS. 3A and 3B, which are exterior and interior views, respectively, of the level indicating apparatus 25 according to an illustrative embodiment of the present invention. These figures comport with FIGS. 2A and 2B, except that in FIGS. 3A and 3B, the plunger 28 is illustrated in the retracted position. In the retracted position, the face of the plunger 28 is approximately flush with the mounting flange 26 and the interior surface of the host container (not shown). The visual indicator 30 moves in unison with the plunger 28, so the visual indicator 30 is pushed away from the end of the frame 24, exposing a visual cue portion 32 of the visual indicator 30. The visual cue portion 32 is fabricated, or painted, a color that contrasts with the surrounding materials such that it is readily perceptible form a distance. For example, bright yellow color with dark gray surrounding materials is a good contrasting color combination.

Figure 4:
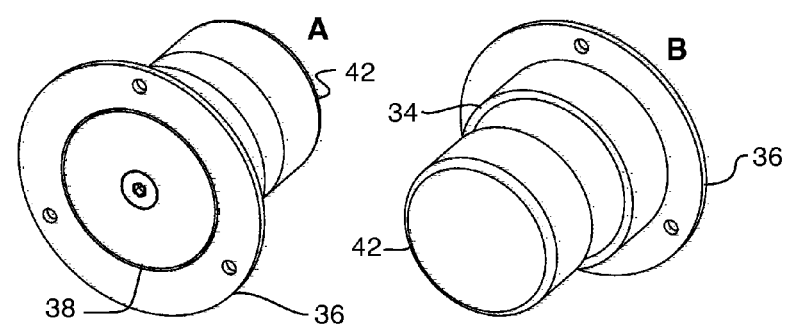
FIGS. 4A and 4B are exterior and interior views, respectively, of a level indicating apparatus according to an illustrative embodiment of the present invention.

Reference is directed to FIGS. 4A and 4B, which are exterior and interior views, respectively, of a level indicating apparatus 33 according to an illustrative embodiment of the present invention. FIG. 4 illustrates a level indicating apparatus 25 that is suitable for use on thick walled containers, such as insulated or cased-wall containers. In these types of containers, the wall thickness is a significant factor in the distance from the level indicator mounting flange 36 to interior surface of the bin (not shown). Thus, the position of the flange 36 along the frame 34, as well as the dimensions of the frame 34, are selected to accommodate the container wall thickness. The level indicator 33 consists of a frame 34, which has a mounting flange 36. The mounting flange attached about an aperture formed in the host container wall (not shown), and the frame 34 extends inwardly from the exterior of the container. A plunger 42 and a visual indicator 38 are slideably supported in the frame 34. In FIGS. 4A and 4B, the level indicator 33 is shown in the extended position, where the plunger portion 42 is extended through the wall thickness and into the interior of the container (not shown). The exterior surface of the visual indicator 30 is flush with the flange 36. Note that FIG. 4A shows the exterior side view, and FIG. 4B shows the interior side view of the visual indicator 33.

Figure 5:
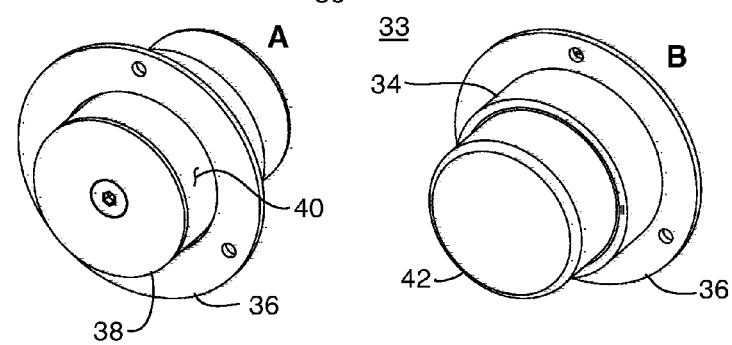
FIGS. 5A and 5B are exterior and interior views, respectively, of a level indicating apparatus according to an illustrative embodiment of the present invention.

Reference is directed to FIGS. 5A and 5B, which are exterior and interior views, respectively, of the level indicating apparatus 33 according to an illustrative embodiment of the present invention. These figures comport with FIGS. 4A and 4B, except that in FIGS. 5A and 5B, the plunger 42 is illustrated in the retracted position. In the retracted position, the face of the plunger 42 is approximately flush with the interior surface of the host container (not shown), but extends from the mounting flange 36 a distance approximately equal to the wall thickness. The visual indicator 38 moves in unison with the plunger 42, so the visual indicator 30 is pushed away from the flange 36, exposing a visual cue portion 40 of the visual indicator 38. The visual cue portion 40 is fabricated, or painted, a color that contrasts with the surrounding materials such that it is readily perceptible form a distance. For example, bright orange color with silver surrounding materials is a good contrasting color combination.

Figure 6:
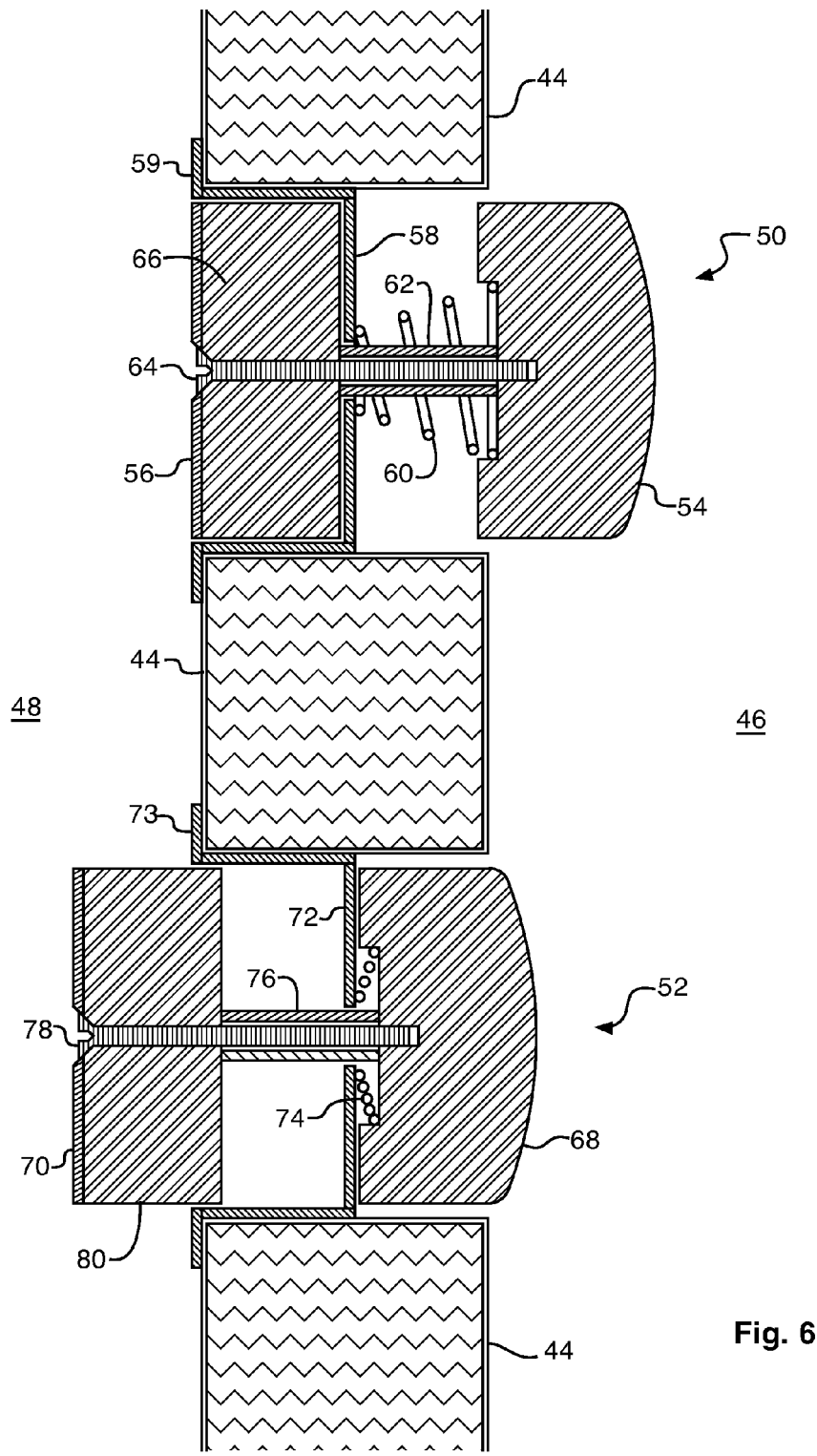
FIG. 6 is a section view drawing of a pair of level indicators according to an illustrative embodiment of the present invention.

Reference is directed to FIG. 6, which is a section view drawing of a pair of level indicators 50, 52 mounted about apertures formed through an insulated container wall 44 according to an illustrative embodiment of the present invention. The insulated wall 44 has a substantial thickness between its interior side 46 and its exterior side 48. The design of the level indicators 50, 52 accommodate this thickness. The upper level indicator 50 is shown in the extended position and the lower level indicator 52 is shown in the retracted position. In the extended position, the plunger 54 is urged into the interior 46 side of the wall 44, while the visual indicator 56 is substantially flush with the mounting flange 59. In the retracted position, the plunger 68 is substantially flush with the wall's 44 interior side 46, while the visual indicator 70 is urged outwardly beyond the mounting flange 73 so as to expose a visual cue portion 80. The visual cue portion 80 is perceived from the exterior side 48 of the wall 44, indicating that liquid pressure is present at the location of that visual indicator 52.

With respect to the internal components and function or the visual indicators 50, 52, there are just a few sturdy and reliable components that implement the design of the illustrative embodiment. Considering the upper level indicator 50, there is a tubular frame 58 with a flange 59, both fabricated from stainless steel. The flange 59 attaches to the container wall 44 on it exterior side 48. The plunger 54 is fabricated from a rigid polymeric material and is connected to the visual indicator 56 by a threaded fastener 64. The plunger 54 has a smooth and rounded end, which has a button-like shape. The visual cue portion 66 of the visual indicator 56 is also fabricated from a polymeric material, while the outer surface 56 is a stainless steel plate. The threaded fastener 64 is tightened against a stainless steel tube 62, such that the fastener 64 is in tension and the tube 62 is in compression. Thus, the plunger 54, tube 62, fastener 64, and visual indicator 56 form a rigid assembly that moves laterally trough an opening in the frame 58. A stainless steel conical compression spring 60 is disposed between the frame 58 and the plunger 54, which urges the plunger 54 to the extended position, as illustrated.

The lower level indicator 52 in FIG. 6 is identical to the upper indicator 50, however the lower level indicator 52 is illustrated in the retracted position. The structure includes a frame 72 with mounting flange 73, a plunger 68 coupled to a visual indicator 70 and visual cue portion 80 by a threaded fastener 78 and tube 76. A spring 74 is disposed between the frame 72 and the plunger 68, and is shown in the fully compressed position. The force required to urge the plunder to the retracted position and compress the spring 74 comes from the force of static pressure of a fluid material (not shown) adjacent to the interior side 46 of container wall 44.

Figure 7:
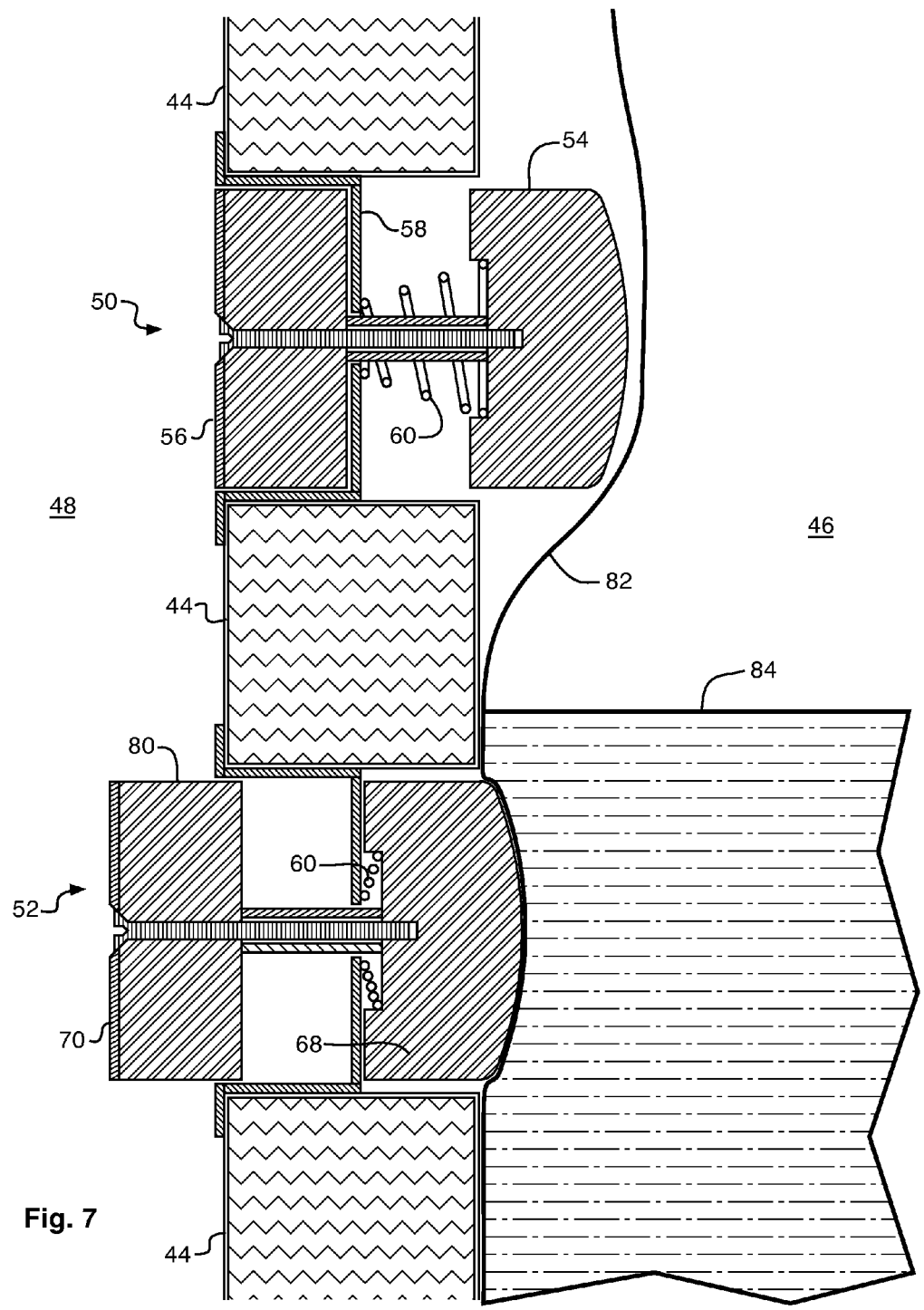
FIG. 7 is a section view drawing of a pair of level indicators according to an illustrative embodiment of the present invention.

Reference is directed to FIG. 7, which is a section view drawing of the pair of level indicators 50, 52 according to an illustrative embodiment of the present invention. In this figure, the liner 82 and liquid 84 are presented on the interior side 46 of the container wall 44, so as to demonstrate the function of the level indicators 50, 52. Again, note that the upper level indicator 50 is shown in the extended position and the lower level indicator 52 is shown in the retracted position. The upper level indicator 50 is extended because the spring 60 has sufficient force to urge the plunger 54 against the liner 82 and into the interior side 46 of the wall 44. The flexible polymeric liner 82 offers little resistance to the spring 60 force. As such, the visual indicator 56 is flush with the exterior side 48 of the wall 44, and does not alert users in the area that the liquid level 84 has reached the position of the upper visual indicator 50.

On the other hand, the liquid level 84 is above the lower level indicator 52 in FIG. 7. As such, the static pressure of the liquid 84 against the plunger 68 overcomes the force of spring 60 and urges the plunger 68 to the refracted position, as illustrated. This action pushes the visual indicator 70 outwardly from the exterior side 48 of the wall 44, and exposes the visual cue portion 80 of the visual indicator 70. The contrasting color of the visual cue portion 80 is readily perceived by users, even from a distance, and indicates that the liquid level is at, or above, the location of the lower level indicator 52.

Reference is directed to FIG. 8, which is a section view drawing of a pair of level indicators 92, 04 mounted about apertures formed through a thin wall container wall 86 according to an illustrative embodiment of the present invention. The thin wall 86 has an insubstantial thickness between its interior side 88 and its exterior side 90. The upper level indicator 92 is shown in the extended position and the lower level indicator 94 is shown in the retracted position. In the extended position, the plunger 98 is urged into the interior 88 side of the wall 86, while the visual indicator 100 is substantially flush with tubular frame 96. In the retracted position, the plunger 112 is substantially flush with the wall's 86 interior side 88, while the visual indicator 114 is urged outwardly beyond the frame 110 so as to expose a visual cue portion 122. The visual cue portion 122 is perceived from the exterior side 90 of the wall 86, indicating that liquid pressure is present at the location of that visual indicator 114.

With respect to the internal components and function or the visual indicators 92, 94, there are just a few sturdy and reliable components that implement the design of the illustrative embodiment. Considering the upper level indicator 92, there is a tubular frame 96 with a flange 97, both fabricated from stainless steel. The flange 97 attaches to the container wall 86 on it exterior side 90. The plunger 92 is fabricated from a rigid polymeric material and is connected to the visual indicator 100 by a threaded fastener 106. The plunger 98 has a smooth and rounded end, which has a button-like shape. The visual cue portion 108 of the visual indicator 100 is also fabricated from a polymeric material, while the outer surface 100 is a stainless steel plate. The threaded fastener 106 is tightened against a stainless steel tube 102, such that the fastener 64 is in tension and the tube 62 is in compression. Thus, the plunger 98, tube 102, fastener 106, and visual indicator 100 form a rigid assembly that moves laterally trough an opening in the frame 96. A stainless steel conical compression spring 104 is disposed between the frame 96 and the plunger 98, which urges the plunger 98 to the extended position, as illustrated.

The lower level indicator 94 in FIG. 8 is identical to the upper indicator 92, however the lower level indicator 94 is illustrated in the retracted position. The structure includes a frame 110 with mounting flange 111, a plunger 112 coupled to a visual indicator 114 and visual cue portion 122 by a threaded fastener 120 and tube 118. A spring 116 is disposed between the frame 110 and the plunger 112, and is shown in the fully compressed position. The force required to urge the plunder to the retracted position and compress the spring 116 comes from the force of static pressure of a fluid material (not shown) adjacent to the interior side 88 of container wall 86.

Reference is directed to FIGS. 9A and 9B, which are schematic diagrams of a level indicator apparatus in the retracted and extended positions, respectively, according to an illustrative embodiment of the present invention. This embodiment presents an alternative arrangement where the plunger 128 and visual indicator 130 are not rigidly connected. In this embodiment, the frame 126 comprises two spaces, which engage the plunger 128 and the visual indicator, respectively.

The forces urging the plunger between the extended and retracted positions are coupled through a lever and pivot mechanism 134. A compression spring 132 urges the visual indicator outwardly, which force couples through the lever and pivot 134 to also urge the plunger to the extended position, in FIG. 9B. When a fluid material (not shown) inside the container wall 124 urges the plunger to the retracted position, in FIG. 9A, the linkage 134 urges the visual indicator outwardly to the indicating position, and also overcomes the force applied by the spring 132.

Reference is directed to FIG. 10, which is a schematic diagram of a level indicator apparatus according to an illustrative embodiment of the present invention. This is another configuration of the level indicator where the plunger 140 and visual indicator 142 are rigidly connected, but where the tubular frame 138 is arcuate, and the movement is guided by a lever rotating about a pivot 148. The frame 138 is mounted to the container wall 136. Note that in this embodiment, a tension spring 144 is connected between the visual indicator 142 and the frame 138. The tension force is coupled from the visual indicator 142 to the plunger 140.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A level indicator apparatus for use with a container having an interior lined with a membrane for holding fluid, which has a wall with an aperture formed there through, said apparatus comprising:
   a frame attachable to the container wall adjacent to the aperture;
   a plunger engaged with said frame, and movable between an extended position, wherein said plunger extends through the aperture and into the interior of the container, and a retracted position, wherein said plunger is substantially located outside of the interior of the container;
   an elastic member disposed between said frame and said plunger, oriented to deliver a force to urge said plunger to said extended position;
   a visual indicator driven by said plunger between an indicating position and a non-indicating position, and wherein
   said force of said elastic member is selected to enable the membrane, under static pressure of fluid within the container, to urge said plunger to said retracted position.

2. The apparatus of claim 1, and wherein the container is a food grade or pharmaceutical grade process bin, and the membrane is a impermeable liner for the storage bin.

3. The apparatus of claim 1, and wherein the membrane is a replaceable polymeric liner.

4. The apparatus of claim 1, and wherein the container wall is an insulated wall or a clad wall, and wherein:
   said frame and said plunger are proportioned to accommodate additional thickness of the container wall.

5. The apparatus of claim 1, and wherein:
   said frame is fabricated from a tubular stock material, and said plunger is movable within said tubular stock material, and said plunger is guided by said tubular stock material.

6. The apparatus of claim 5, and wherein:
   said tubular stock material is round stainless steel.

7. The apparatus of claim 1, and wherein said frame further comprises:
a flange that is fastenable to the wall about the aperture.

8. The apparatus of claim 1, and wherein:
said plunger is fabricated from a polymeric material.

9. The apparatus of claim 1, and wherein:
said plunger comprises a distal face portion for engaging the membrane, and wherein said distal face portion is smooth and rounded to reduce possible damage to the membrane.

10. The apparatus of claim 1, and wherein:
said elastic member is a spring.

11. The apparatus of claim 10, and wherein:
said spring is selected from a compression spring and a tension spring.

12. The apparatus of claim 10, and wherein:
said spring couples said force to said plunger through a linkage.

13. The apparatus of claim 12, and wherein:
said linkage is a lever.

14. The apparatus of claim 1, and wherein:
said visual indicator comprises a visual cue portion, and wherein said visual cue portion is visible in said indicating position, and said visual cue portion is concealed in said non-indicating position.

15. The apparatus of claim 14, and wherein:
said frame conceals said visual cue portion in said non-indicating position.

16. The apparatus of claim 14, and wherein:
said visual cue portion is finished in a color that contrasts with said frame.

17. The apparatus of claim 1, and wherein:
said plunger and said visual indicator are rigidly connected, and are movable in unison.

18. The apparatus of claim 1, and wherein:
said plunger and said visual indicator are connected by a linkage.

19. The apparatus of claim 1, and wherein:
said plunger and said visual indicator are connected through a pivot.

20. A level indicator apparatus for use with a process bin, suitable for pharmaceutical product production, having an impermeable polymeric liner for holding fluid therein, and which has a wall with an aperture formed there through, said apparatus comprising:
a tubular frame with a flange for attachment to the process bin wall about the aperture;
a plunger engaged within said tubular frame, and movable therein between an extended position, wherein said plunger extends through the aperture and into the interior of the storage bin, and a retracted position, wherein said plunger is substantially located outside of the interior of the storage bin, and wherein
said plunger comprises a distal face portion for engaging the impermeable polymeric liner, and wherein said distal face portion is smooth and rounded to reduce possible damage to the impermeable polymeric liner;
a spring disposed between said frame and said plunger, oriented to deliver a force to urge said plunger to said extended position;
a visual indicator rigidly connected to said plunger to move in unison therewith, between an indicating position and a non-indicating position, said visual indicator having a visual cue portion, wherein said visual cue portion is visible in said indicating position, and said visual cue portion is concealed by said tubular frame in said non-indicating position, and wherein said visual cue portion is finished in a color that contrasts with said frame, and wherein
said force of said spring is selected to enable the impermeable polymeric liner, under static pressure of fluid within the storage bin, to urge said plunger to said retracted position, thereby exposing said visual cue portion of said visual indicator.

\* \* \* \* \*